US012230883B2

(12) United States Patent
Martin et al.

(10) Patent No.: US 12,230,883 B2
(45) Date of Patent: Feb. 18, 2025

(54) ANTENNA ARRAY WITH CROSS-POLARIZATION LEAKAGE SUPPRESSION

(71) Applicant: REQUTECH AB, Linköping (SE)

(72) Inventors: Torleif Martin, Linköping (SE); Omid Sotoudeh, Linköping (SE)

(73) Assignee: REQUTECH AB, Linkoping (SE)

( * ) Notice: Subject to any disclaimer, the term of this patent is extended or adjusted under 35 U.S.C. 154(b) by 172 days.

(21) Appl. No.: 17/927,858

(22) PCT Filed: May 26, 2021

(86) PCT No.: PCT/EP2021/063976
§ 371 (c)(1),
(2) Date: Nov. 25, 2022

(87) PCT Pub. No.: WO2021/239776
PCT Pub. Date: Dec. 2, 2021

(65) Prior Publication Data

US 2023/0208022 A1 Jun. 29, 2023

(30) Foreign Application Priority Data

May 28, 2020 (SE) .................................... 2030176-8

(51) Int. Cl.
*H01Q 21/24* (2006.01)
*H01Q 1/28* (2006.01)

(52) U.S. Cl.
CPC ........... *H01Q 21/245* (2013.01); *H01Q 1/288* (2013.01)

(58) Field of Classification Search
CPC ..... H01Q 19/028; H01Q 21/24; H01Q 21/245
See application file for complete search history.

(56) References Cited

U.S. PATENT DOCUMENTS 4,947,182 A 8/1990 Andersson
5,760,740 A * 6/1998 Blodgett ................ H04B 1/126 342/362

(Continued)

FOREIGN PATENT DOCUMENTS

CN 108666743 10/2018

OTHER PUBLICATIONS

International Search Report for PCT/EP2021/063976 dated Aug. 17, 2021, 2 pages.

(Continued)

*Primary Examiner* — Daniel Munoz
(74) *Attorney, Agent, or Firm* — NIXON & VANDERHYE

(57) ABSTRACT

A method for improving cross-polarization discrimination in a dual-polarized antenna array that includes antenna elements, each including at least two feeding ports to excite the antenna element with mutually independent signals having respective complex amplitudes. The method includes: determining, for each feeding port and antenna element, an electromagnetic far field resulting from excitation of the antenna by the feeding port as field components corresponding to two orthogonal linear polarizations and selecting the handedness of a desired circular polarization in the far field; determining, based on a predetermined relationship between the field components corresponding to the two orthogonal linear polarizations and on the desired circular polarization in the far field, a ratio between the complex amplitudes of excitation of the feeding ports of each antenna element, the ratio being associated with an increased cross-polarization discrimination; and exciting the antenna elements with signals having complex amplitudes in the determined ratio.

20 Claims, 4 Drawing Sheets

(56) References Cited

U.S. PATENT DOCUMENTS

| | | | |
|---|---|---|---|
| 6,147,648 A | 11/2000 | Granholm et al. | |
| 6,307,502 B1 | 10/2001 | Marti-Canales et al. | |
| 9,929,886 B2 * | 3/2018 | Amadjikpe .......... | H01Q 21/065 |
| 2017/0149144 A1 | 5/2017 | Gallagher et al. | |
| 2017/0288312 A1 | 10/2017 | Koskiniemi et al. | |
| 2018/0234119 A1 | 8/2018 | Gharavi et al. | |

OTHER PUBLICATIONS

Written Opinion of the ISA for PCT/EP2021/063976 dated Aug. 17, 2021, 7 pages.

Swedish Search Report for SE 2030176-8 dated Feb. 4, 2021, 2 pages.

Kuhlmann, "Hochintegrierte active Sendeantenne fur den Millimeterwellenbereich", Dissertation, 2013, pp. 1-125.

Salas-Natera et al., "Circularly Polarized Active Antenna Array System Calibration for Improved Axial Ratio Systems", 13$^{th}$ European Conference on Antennas and Propagation (EUCAP), European Association on Antennas and Propagation, Mar. 31, 2019, pp. 1-5.

Pawlak et al., "An External Calibration Scheme for DBF Antenna Arrays", IEEE Transactions on Antennas and Propagation, IEEE Service Center, vol. 58, No. 1, Jan. 1, 2010, pp. 59-67.

Steyskal et al., "Mutual coupling compensation in small array antennas", IEEE Transactions on Antennas and Propagation, IEEE Service Center, vol. 38, No. 12, Dec. 12, 1990, pp. 1971-1975.

* cited by examiner

ANTENNA ARRAY WITH CROSS-POLARIZATION LEAKAGE SUPPRESSION

This application is the U.S. national phase of International Application No. PCT/EP2021/063976 filed May 26, 2021 which designated the U.S. and claims priority to SE 2030176-8 filed May 28, 2020, the entire contents of each of which are hereby incorporated by reference.

TECHNICAL FIELD

The present disclosure relates to array antennas and methods for suppressing cross-polarization leakage in array antennas.

BACKGROUND

Dual polarization antennas, such as used e.g. in satellite communications, are required to have high cross-polarization discrimination, i.e. to be able to selectively transmit or receive radiation of a specific polarization.

CN108666743A presents an antenna array with improved cross-polarization discrimination, where the radiating elements are divided into groups and where the feeding structures are arranged symmetrically within the group.

U.S. Pat. No. 6,147,648A presents another antenna array with improved cross-polarization discrimination, where the radiating elements are divided into groups and where the elements within each group are excited in such a way as to increase cross-polarization discrimination.

However, there is a need for improved cross-polarization discrimination in antenna arrays.

SUMMARY

It is an object of the present disclosure to provide a method for improving cross-polarization discrimination in antenna arrays.

This object is obtained by a method for improving cross-polarization discrimination in a dual-polarized antenna array, the antenna array comprising a plurality of antenna elements, each antenna element comprising at least two feeding ports arranged to excite the antenna element with mutually independent signals having respective complex amplitudes. The method comprises determining, for each of the feeding ports and for each antenna element, an electromagnetic far field resulting from excitation of the antenna element by the feeding port in terms of field components corresponding to two orthogonal linear polarizations and selecting a desired circular polarization to be either right-handed or left-handed circular polarization. The method further comprises determining, based on a predetermined relationship between the field components corresponding to the two orthogonal linear polarizations and on the desired circular polarization, a ratio between the complex amplitudes of excitation of the feeding ports of each antenna element, wherein the ratio is associated with an increased cross-polarization discrimination, and exciting the antenna elements with signals having complex amplitudes according to the determined ratio.

By determining the ratio between the complex amplitudes of excitation of the feeding ports of each antenna element based on a previously determined electromagnetic far field resulting from excitation of the antenna element by the feeding ports, it is possible to compensate for issues such as interactions between the antenna elements in the antenna array and asymmetries in the antenna array elements, which may otherwise lead to reduced cross-polarization discrimination.

According to aspects, the method may also comprise determining the electromagnetic far field for a plurality of directions, and determining the ratio between the complex amplitudes of the excitations of the feeding ports of each antenna element for a desired direction of transmission and/or reception based on the determined electromagnetic far field in the desired direction. Advantageously, this makes it possible to increase cross-polarization discrimination over the entire field of view of the array, even though the ratio between the complex amplitudes of excitation associated with an increased cross-polarization discrimination may be different for different directions.

According to other aspects, the electromagnetic far field may be determined for a plurality of frequencies, and the ratio between the complex amplitudes of the excitations of the feeding ports of each antenna element may be determined for a desired frequency of transmission and/or reception based on the determined electromagnetic far field at the desired frequency.

For an antenna array, it is possible that the electromagnetic far field resulting from excitation of an antenna element by the feeding ports will depend on the frequency of the signal. Advantageously, the electromagnetic far field being known for multiple frequencies of transmission and/or reflection makes it possible to improve cross-polarization discrimination across a frequency band in which the antenna array operates despite this frequency dependence.

The method may also comprise that the ratio between the complex amplitudes of excitation of two feeding ports of an antenna element is determined as $$\frac{b}{a} = -\frac{\left(E_\theta^a - jE_\varphi^a\right)}{\left(E_\theta^b - jE_\varphi^b\right)},$$

in the case of right-handed circular polarization being the desired polarization and $$\frac{b}{a} = -\frac{\left(E_\theta^a + jE_\varphi^a\right)}{\left(E_\theta^b + jE_\varphi^b\right)},$$

in the case of left-handed circular polarization being the desired polarization, where a and b are the complex amplitudes of the first and second feeding ports, $E_\theta^a$ is the field component in the θ direction arising from excitation of the first feeding port, $E_\varphi^a$ is the field component in the φ direction arising from excitation of the first feeding port, $E_\theta^b$ is the field component in the θ direction arising from excitation of the second feeding port, and $E_\varphi^b$ is the field component in the φ direction arising from excitation of the second feeding port.

According to aspects, the complex amplitudes of the excitations of the feeding ports of each antenna element are normalized by the value of the largest complex amplitude for that antenna element. Advantageously, this ensures that the magnitude of the complex amplitude does not exceed the capabilities of the antenna array.

The method may comprise determining the complex amplitudes of the excitations of the feeding ports associated with increased cross-polarization discrimination in advance for at least one desired polarization and storing the values in a lookup table from which they can be retrieved during operation of the antenna array. This has the advantage of reducing the number of calculations that need to be done during operation of the antenna array, potentially enabling faster operation.

According to aspects, the lookup table may comprise complex amplitudes calculated for a plurality of desired directions of transmission and/or reception. According to other aspects, the lookup table comprises complex amplitudes calculated for a plurality of desired frequencies of transmission and/or reception.

The object is further obtained by an antenna array system comprising a dual-polarized antenna array and an antenna array control unit, the antenna array comprising a plurality of antenna elements, each antenna element comprising at least two feeding ports arranged to excite the antenna element with mutually independent signals having respective complex amplitudes, an electromagnetic far-field resulting from excitation of each of the antenna elements by each feeding port being known in terms of the field components corresponding to two orthogonal linear polarizations. The system is arranged to select a desired circular polarization to be either right-handed or left-handed circular polarization and determine, based on a predetermined relationship between the field components corresponding to the two orthogonal linear polarizations and on the desired circular polarization, a ratio between the complex amplitudes of the excitation of the feeding ports of each antenna element wherein the ratio is associated with increased cross-polarization discrimination. The system is further arranged to excite the antenna elements with signals having complex amplitudes according to the determined ratio.

According to aspects, the electromagnetic far field may be known for a plurality of directions, and the relation between the complex amplitudes of the excitations of the feeding ports of each antenna element may be determined for a desired direction of transmission and/or reception based on the known electromagnetic far field in the desired direction.

According to other aspects, the electromagnetic far field may be known for a plurality of frequencies and the relation between the complex amplitudes of the excitations of the feeding ports of each antenna element may be determined for a desired frequency of transmission and/or reception based on the determined electromagnetic far field for the desired frequency.

The system may be arranged such that the ratio between the complex amplitudes of excitation of two feeding ports of an antenna element is determined as:

$$\frac{b}{a} = -\frac{(E_\theta^a - jE_\varphi^a)}{(E_\theta^b - jE_\varphi^b)},$$

in the case of right-handed circular polarization being the desired polarization and $$\frac{b}{a} = -\frac{(E_\theta^a + jE_\varphi^a)}{(E_\theta^b + jE_\varphi^b)},$$

in the case of left-handed circular polarization being the desired polarization, where a and b are the complex amplitudes of the first and second feeding ports, $E_\theta^a$ is the field component in the θ direction arising from excitation of the first feeding port, $E_\varphi^a$ is the field component in the φ direction arising from excitation of the first feeding port, $E_\theta^b$ is the field component in the θ direction arising from excitation of the second feeding port, and $E_\varphi^b$ is the field component in the φ direction arising from excitation of the second feeding port.

According to aspects, the system may be arranged such that the complex amplitudes of the excitations of the feeding ports of each antenna element are normalized by the value of the largest complex amplitude for that antenna element.

According to other aspects, the complex amplitudes of the excitations of the feeding ports associated with increased cross-polarization discrimination may have been calculated in advance for at least one desired polarization and the values stored in a lookup table in the antenna array control system, from which they can be retrieved during operation of the antenna array. The lookup table may comprise complex amplitudes calculated for a plurality of desired directions of transmission and/or reception. The lookup table may also comprise complex amplitudes calculated for a plurality of desired frequencies of transmission and/or reception.

The systems disclosed herein are associated with the same advantages as discussed above in connection to the various methods.

The object is further obtained by satellite system comprising an antenna array system according to the above description. It is also obtained by a computer program for operating an antenna array to increase cross polarization discrimination, the computer program comprising computer code which, when run on processing circuitry of an antenna array system, causes the antenna array to execute a method as previously described, and by a computer program product comprising a computer program as described, and a computer readable storage medium on which the computer program is stored.'

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described more in detail with reference to the appended drawings, where.

DETAILED DESCRIPTION

Figure 1:
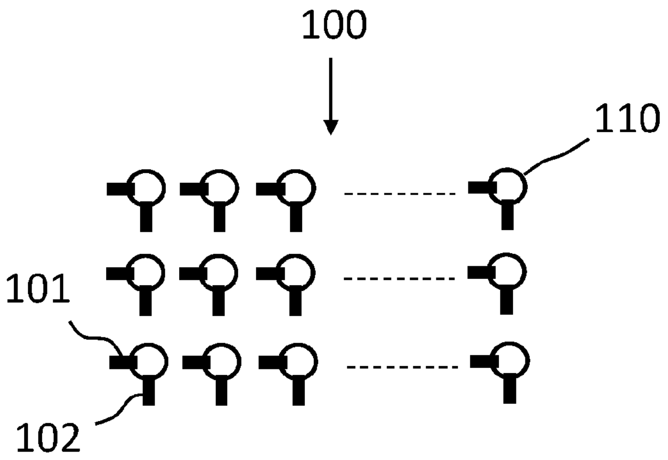
FIG. 1 is a schematic drawing of an antenna array.

Aspects of the present disclosure will now be described more fully with reference to the accompanying drawings.

The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 shows a schematic drawing of an antenna array 100, comprising a plurality of antenna elements 110, where each antenna element comprises at least two feeding ports 101, 102 arranged to excite the antenna element with mutually independent signals having respective complex amplitudes.

Herein, an antenna element 110 is an element arranged to emit radiation when it is excited with a signal. An antenna element 110 can for example be a patch antenna, or a bowtie antenna. An antenna array 100 is comprised of multiple such elements, arranged to function as one antenna and to emit and receive radio-frequency signals.

The signals used to excite the antenna elements are, in this context, part of the radio-frequency signal to be emitted by the array, or in the case of reception, the radio-frequency signal to be received by the array. The signal can for example be applied to the feeding ports in the form of an alternating current. Exciting of the antenna element with a signal causes it to emit radiation of the same frequency, with an amplitude and phase determined by the amplitude and phase of the applied signal. Here, the amplitude and phase of the applied signal taken together are referred to as the complex amplitude of the signal, and changing the complex amplitude of the signal results in a change in amplitude and/or a phase shift of the emitted radiation.

That the feeding ports 101, 102 are arranged to excite the antenna element with mutually independent signals is herein taken to mean that the characteristics of the signals applied to the feeding ports can be changed independently of each other. In particular, the complex amplitude of the applied signals can be adjusted separately. It is thus possible to set an arbitrary phase shift and/or amplitude difference between the two signals.

In a dual-polarized antenna array, the feeding ports 101, 102 of each antenna element 110 are arranged so that each feeding port mostly transmits and receives linearly polarized radiation whose polarization is substantially orthogonal to that of the radiation transmitted and received by the other feeding port. Transmission of circularly polarized radiation is achieved by exciting both feeding ports 101, 102 with signals having the same amplitude and frequency, but with the signal used to excite the second feeding port 102 phase shifted relative to that applied to the first feeding port 101.

Figure 2:
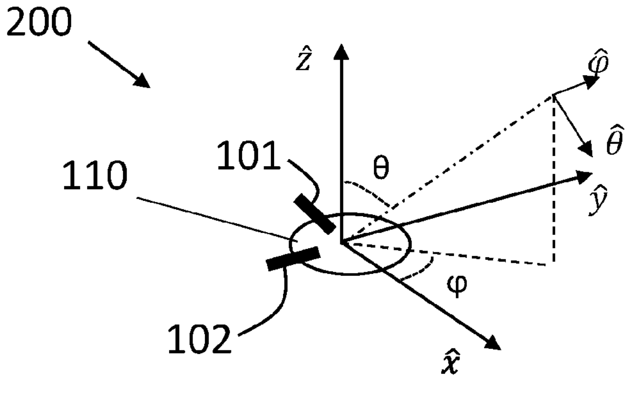
FIG. 2 shows a coordinate system in relation to an antenna element.

With reference to the coordinate system 200 shown in relation to an antenna element 110 in FIG. 2, the emitted or received radiation can be described in polar coordinates as made up of field components polarized along the direction indicated by $\hat{\theta}$ or along the direction indicated by $\hat{\varphi}$. The directions of vectors $\hat{\theta}$ and $\hat{\varphi}$ relative to feeding ports 101, 102 will be different for different values of the angles $\theta$ and $\varphi$. As an example, for $\varphi=0$, the first feeding port 101 should theoretically transmit and receive only $\hat{\theta}$-polarized radiation and the second feeding port 102 only $\hat{\varphi}$-polarized radiation. The signal used to excite the second feeding port 102 could then be phase shifted by +/−90°, relative to the signal used to excite the first feeding port, for right- and left-hand circular polarization, respectively.

The field components polarized along $\hat{\theta}$ and $\hat{\varphi}$ in the emitted radiation can be measured. The circularly polarized field components are then found from the measured values as:

$$E_{RHCP} = \frac{1}{\sqrt{2}}(E_\theta + jE_\varphi) \tag{1}$$

$$E_{LHCP} = \frac{1}{\sqrt{2}}(E_\theta - jE_\varphi), \tag{2}$$

where $E_{RHCP}$ and $E_{LHCP}$ denote the electric field strength corresponding to right- and left-hand circular polarization, respectively, $E_\theta$ is the electric field strength of the $\hat{\theta}$-polarized field component and $E_\varphi$ is the electric field strength of the $\hat{\varphi}$-polarized field component. Multiplication by the imaginary unit j is equivalent to a 90° phase shift.

In an antenna array, issues such as coupling between the feeding ports 101, 102, coupling between antenna elements 110, and asymmetries in the antenna element lead to the feeding ports 101, 102 transmitting and receiving radiation that is not mutually orthogonal. That is, the electric field resulting from excitation from the first feeding port 101 will not be completely orthogonal to that resulting from excitation of the second feeding port 102, but the two electric fields will have some parallel field components. The parallel field components can be found through measuring the field components polarized along $\hat{\theta}$ and $\hat{\varphi}$ for each feeding port.

For an antenna element 110, where the first feeding port 101 is excited with a signal having complex amplitude a, and where the second feeding port 102 is excited with a signal having complex amplitude b, the total $\hat{\theta}$-polarized field component is given by $$E_\theta = aE_\theta^a + bE_\theta^b, \tag{3}$$

and the total $\hat{\varphi}$-polarized field component is given by $$E_\varphi = aE_\varphi^a + bE_\varphi^b, \tag{4}$$

where $E_\theta^a$ is the field component in the $\hat{\theta}$ direction arising from excitation of the first feeding port, $E_\varphi^a$ is the field component in the $\hat{\varphi}$ direction arising from excitation of the first feeding port, $E_\theta^b$ is the field component in the $\hat{\theta}$ direction arising from excitation of the second feeding port, and $E_\varphi^b$ is the field component in the $\hat{\varphi}$ direction arising from excitation of the second feeding port.

If transmission of circularly polarized radiation is attempted as described above, with a +/−90° phase shift of the signal applied to the second feeding port 102 relative to the signal applied to the first feeding port 101, the lack of mutual orthogonality between the polarizations of radiation resulting from excitation of the feeding ports 101, 102 described above will result in a reduced cross-polarization discrimination. However, if the field components $E_\theta^a$, $E_\varphi^a$, $E_\theta^b$, and $E_\varphi^b$ are measured for each antenna element, it is possible to calculate values of the complex amplitudes a and b for each antenna element that compensate for the lack of mutual orthogonality between the feeding ports and result in an improved cross-polarization discrimination for the antenna array.

Figure 3:
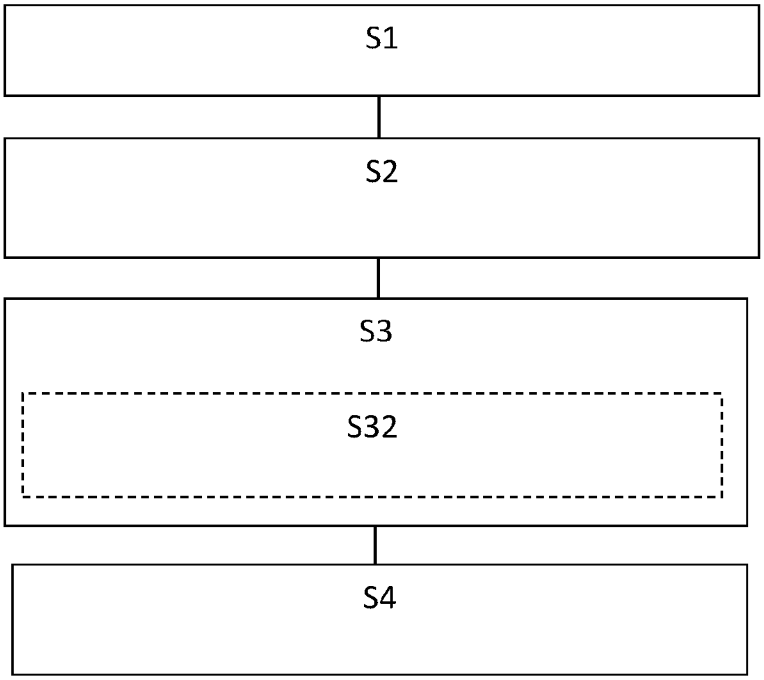
FIG. 3 is a flowchart describing the disclosed methods.

The method herein disclosed is a method in an antenna array 100, comprising a plurality of antenna elements 110, where each antenna element comprises at least two feeding ports 101, 102 arranged to excite the antenna element with mutually independent signals having respective complex amplitudes. As shown in FIG. 3, the method comprises determining S1, for each of the feeding ports 101, 102 and for each antenna element 110, the electromagnetic far field resulting from excitation of the antenna element by the feeding port in terms of field components corresponding to two orthogonal linear polarizations. The electromagnetic far field is here intended to be the electromagnetic field at a distance from the antenna array such that the electromagnetic waves emitted by the array can be regarded as plane waves. That is, the method comprises determining the linearly polarized field components $E_\theta^a$, $E_\varphi^a$, $E_\theta^b$, and $E_\varphi^b$ for each antenna element. As an example, the field components can be measured when each feeding port is, one by one, excited with a signal of unit amplitude. The signal may be a continuous wave signal, a pulse, or some other type of signal. During the measurement, the surrounding antenna elements are expected to be passive and terminated in a matched load (for example, a 50 Ohm load is commonly used). Load matching is well known in the art.

The method also comprises selecting S2 a desired polarization to be either right-handed or left-handed circular polarization. Furthermore, it comprises determining S3, based on a predetermined relationship between the previously determined field components $E_\theta^a$, $E_\varphi^a$, $E_\theta^b$, and $E_\varphi^b$ corresponding to the two orthogonal linear polarizations and on the desired circular polarization, a ratio between the complex amplitudes of excitation of the feeding ports 101, 102 of each antenna element 110, wherein the ratio is associated with an increased cross-polarization discrimination.

A predetermined relationship between the field components $E_\theta^a$, $E_\varphi^a$, $E_\theta^b$, and $E_\varphi^b$ can be derived as follows. If, for example, the desired polarization is right-handed circular polarization, it follows that the field component corresponding to left-handed circular polarization must be minimized for increased cross-polarization discrimination. The contribution to the left-handed circular polarized field component from one antenna element can be expressed in terms of the linearly polarized field components $E_\theta^a$, $E_\varphi^a$, $E_\theta^b$, and $E_\varphi^b$ and the complex amplitudes a, b of the mutually independent signals as $$E_{LHCP} = \frac{1}{\sqrt{2}}(E_\theta - jE_\varphi) = \frac{1}{\sqrt{2}}\left(aE_\theta^a + bE_\theta^b - jaE_\varphi^a - jbE_\varphi^b\right). \tag{5}$$

Since the linearly polarized field components $E_\theta^a$, $E_\varphi^a$, $E_\theta^b$, and $E_\varphi^b$ have been determined, a ratio of the complex amplitudes can now be determined that minimizes the above expression. The corresponding expression for right-hand circular polarization is $$E_{RHCP} = \frac{1}{\sqrt{2}}(E_\theta + jE_\varphi) = \frac{1}{\sqrt{2}}\left(aE_\theta^a + bE_\theta^b + jaE_\varphi^a + jbE_\varphi^b\right). \tag{6}$$

The method further comprises exciting S4 the antenna elements 110 with signals having complex amplitudes according to the determined ratio.

An antenna array is ordinarily designed to be able to transmit and receive radiation at a plurality of carrier frequencies within a frequency band. However, issues such as coupling between antenna elements and asymmetries in the antenna elements may have somewhat different effects at different frequencies in the frequency band. This means that the linearly polarized field components $E_\theta^a$, $E_\varphi^a$, $E_\theta^b$, and $E_\varphi^b$ may be different at different frequencies. Therefore, the method also comprises determining the electromagnetic far field for a plurality of frequencies, and determining the ratio between the complex amplitudes of the excitations of the feeding ports 101, 102 of each antenna element 110 for a desired frequency of transmission and/or reception based on the determined electromagnetic far field at the desired frequency.

A frequency band is herein taken to comprise all frequencies between a limiting lowest frequency and a limiting highest frequency, where the limiting lowest and highest frequencies are the lowest and highest frequency at which the antenna array can operate. The plurality of frequencies at which the electromagnetic far field is determined should be a set of frequencies that cover the entire frequency band in which the antenna is designed to operate. As an example, the electromagnetic far field may be determined at 1000 frequency points evenly distributed throughout the frequency band. As another example, the number and distribution of frequencies at which the electromagnetic far field is determined may depend on to what extent the electromagnetic far field changes due to changes in frequency, such that the frequencies at which the electromagnetic far field are measured are more densely spaced the more the electromagnetic far field changes due to a change in frequency.

The antenna array may be arranged to allow beam steering. That is, during transmission it may be possible to apply different phase shifts to signals applied to the feeding ports of individual antenna elements in such a way as to direct the transmitted radiation in a chosen direction. When the antenna array is receiving radiation, it may conversely be possible to determine the direction of arrival of a signal based on the relative phase shift between antenna elements receiving the signal. Beam steering is well known in the art.

Figure 4:
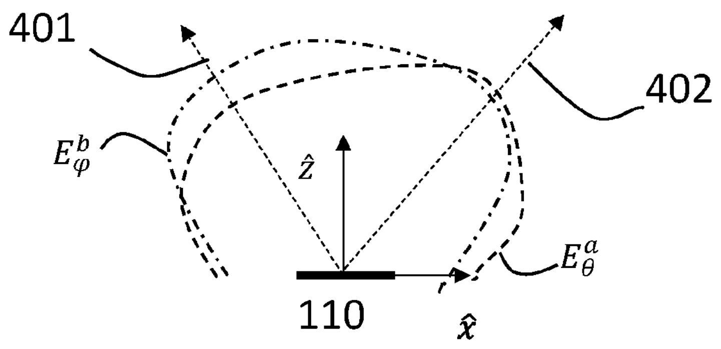
FIG. 4 is a schematic drawing of electric field strengths.
Figure 5:
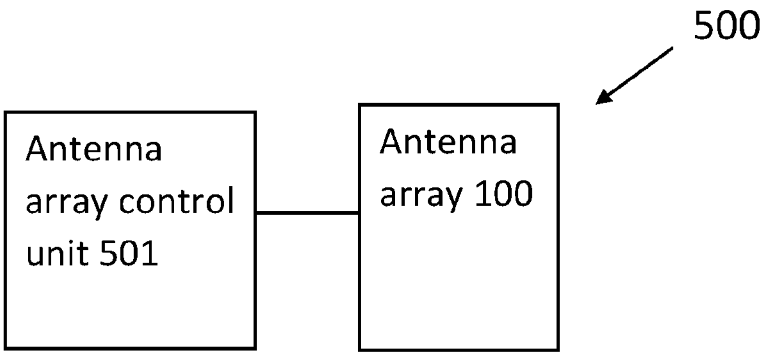
FIG. 5 is a schematic of an antenna array system comprising a control unit.

For the purposes of the present disclosure, it is important to note that the linearly polarized field components $E_\theta^a$, $E_\varphi^a$, $E_\theta^b$, and $E_\varphi^b$ for each antenna element 110 will be different in different directions from the antenna element. This is schematically illustrated in FIG. 4, where the absolute value of the field components $E_\theta^a$ and $E_\varphi^b$ around an antenna element 110 are shown. It should be noted with reference to the coordinate system in FIG. 2 that the schematic illustration in FIG. 4 considers the case of $\varphi=0$, but similar illustrations could be made for other values of the angle $\varphi$. The relative magnitude of the field components differs between the two indicated transmission directions 401, 402. Consequently, the complex amplitudes that minimize the non-desired circular polarization may be different for different directions. If beam steering is used in operating the antenna array and, for example, transmit a signal in a desired direction it is necessary to know the linearly polarized field components for a plurality of directions and determine the complex amplitudes based on the electromagnetic far field in the desired direction of transmission or reception in order to ensure high cross-polarization discrimination.

Therefore, the method may also comprise determining the electromagnetic far field for a plurality of directions 401, 402 and determining the ratio between the complex amplitudes of the excitations of the feeding ports of each antenna element 110 for a desired direction of transmission and/or reception based on the determined electromagnetic far field in the desired direction.

It is understood that the method may also comprise determining the electromagnetic far field for a plurality of frequencies in the frequency band in which the antenna array is designed to operate for each of a plurality of directions 401, 402, making it possible to simultaneously adapt the complex amplitudes to a desired frequency and a desired direction of transmission and/or reception.

Figure 6:
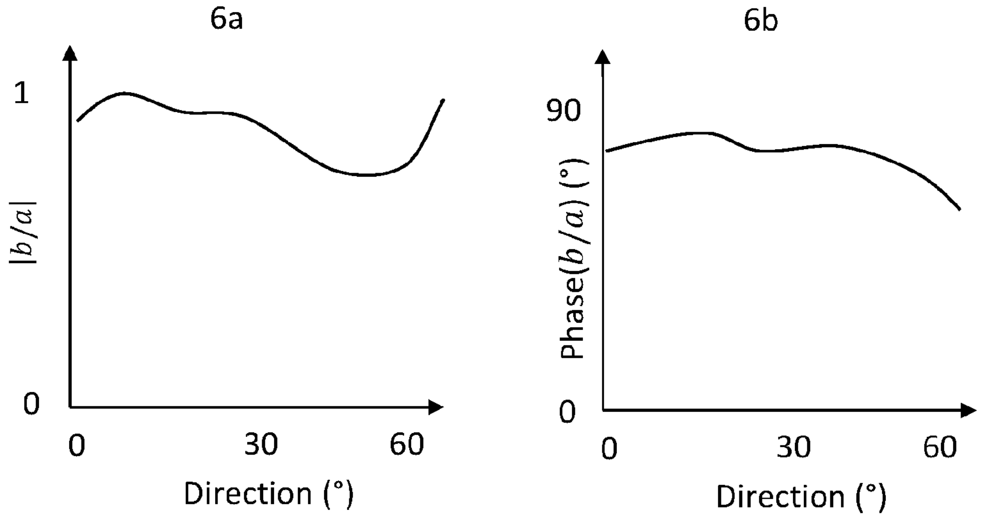
FIG. 6 shows the variation of a magnitude and phase of a ratio of two complex amplitudes for different angles.

FIG. 6 shows a schematic depiction of how the ratio between the complex amplitudes may vary depending on the desired direction. Here, the direction is defined via the angle relative to the z axis, denoted by θ in FIG. 2, with φ=0. Similar illustrations could be made for different values of the angle co, although the curves would look slightly different due to the dependence of the complex amplitude on direction, as well as for different values of the frequency since the ratio between the complex amplitudes depends on both direction and frequency. FIG. 6*a* depicts variation in the magnitude of the ratio, while FIG. 6*b* shows the variation of the phase of the ratio.

Returning to equations 5 and 6, it can be seen that if the contribution to the electric far field from the non-desired circular polarization is set to zero, a ratio between the complex amplitudes a and b can be obtained. The method may thus also comprise that a ratio between the complex amplitudes of excitation of two feeding ports 101, 102 of an antenna element 110 is determined as $$\frac{b}{a} = -\frac{(E_\theta^a - jE_\varphi^a)}{(E_\theta^b - jE_\varphi^b)}, \tag{7}$$

in the case of right-handed circular polarization being the desired polarization and $$\frac{b}{a} = -\frac{(E_\theta^a + jE_\varphi^a)}{(E_\theta^b + jE_\varphi^b)}, \tag{8}$$

in the case of left-handed circular polarization being the desired polarization.

On determining a ratio between the complex amplitudes that will minimize the non-desired circular polarization, the complex amplitudes will be set to values that satisfy this ratio. It must be taken into consideration that the maximum possible amplitude may be limited by, e.g., the construction of the antenna array or the properties of the components used in the antenna array. Thus, the method may also comprise that the complex amplitudes of the excitations of the feeding ports 101, 102 of each antenna element 110 are normalized S32 by the magnitude of the largest complex amplitude for that antenna element. As an example, if the magnitude of the ratio of the complex amplitudes $$\left|\frac{b}{a}\right| > 1,$$

b is set to 1 and the value of a is calculated using one of equations 7 and 8. If instead the magnitude of the ratio of the complex amplitudes $$\left|\frac{b}{a}\right| < 1,$$

a is set to 1 and the value of b is calculated using one of equations 7 and 8.

The method may also comprise determining the complex amplitudes of the excitations of the feeding ports 101, 102 associated with increased cross-polarization discrimination in advance for at least one desired polarization and storing the values in a lookup table from which they can be retrieved during operation of the antenna array. This lookup table may also comprise complex amplitudes calculated for a plurality of desired directions of transmission, as well as complex amplitudes calculated for a plurality of desired frequencies of transmission and/or reception. Optionally, the normalized ratio of the complex amplitudes may be stored instead of the complex amplitudes. This reduces the need for computations to be carried out during operation of the antenna array, potentially enabling faster operation.

There is also herein disclosed an antenna array system 500 comprising a dual-polarized antenna array 100 and an antenna array control unit 501, the antenna array 100 comprising a plurality of antenna elements 110, each antenna element comprising at least two feeding ports 101, 102 arranged to excite the antenna element with mutually independent signals having respective complex amplitudes, an electromagnetic far-field resulting from excitation of each of the antenna elements 110 by each feeding port 101, 102 being known in terms of the field components corresponding to two orthogonal linear polarizations, wherein the system is arranged to select a desired circular polarization to be either right-handed or left-handed circular polarization, determine, based on a predetermined relationship between the field components corresponding to the two orthogonal linear polarizations and on the desired circular polarization, a ratio between the complex amplitudes of the excitation of the feeding ports 101, 102 of each antenna element 110 wherein the ratio is associated with increased cross-polarization discrimination, and excite the antenna elements 110 with signals having complex amplitudes according to the determined ratio.

The electromagnetic far field may be known for a plurality of directions 401, 402. In this case, the system may be arranged to determine the relation between the complex amplitudes of the excitations of the feeding ports 101, 102 of each antenna element 110 for a desired direction of transmission or reception based on the known electromagnetic far field in the desired direction.

The electromagnetic far field may also be known fora plurality of frequencies. In this case, the system may be arranged to determine the relation between the complex amplitudes of the excitations of the feeding ports 101, 102 for each antenna element 110 for a desired frequency of transmission or reception based on the known electromagnetic far field at the desired frequency.

The system may further be arranged such that the ratio between the complex amplitudes of excitation of two feeding ports 101, 102 of an antenna element 110 is determined as:

$$\frac{b}{a} = -\frac{(E_\theta^a - jE_\varphi^a)}{(E_\theta^b - jE_\varphi^b)},$$

in the case of right-handed circular polarization being the desired polarization and $$\frac{b}{a} = -\frac{(E_\theta^a + jE_\varphi^a)}{(E_\theta^b + jE_\varphi^b)},$$

in the case of left-handed circular polarization being the desired polarization.

The system may also be arranged to normalize the complex amplitudes of the excitations of the feeding ports 101, 102 of each antenna element 110 by the value of the largest complex amplitude for that antenna element.

The system may also comprise a lookup table, stored in the antenna array control system 501, containing complex amplitudes of the excitations of the feeding ports 101, 102 associated with increased cross-polarization discrimination that have been calculated in advance for at least one desired polarization. Said lookup table may also comprise complex amplitudes calculated for a plurality of desired directions of transmission or reception and may also comprise complex amplitudes calculated for a plurality of desired frequencies of transmission or reception. To store the lookup table, the antenna array control system may be equipped with a computer readable storage medium. As an example, the computer readable storage medium may be a flash drive. As another example, the computer readable storage medium may be a conventional hard disk drive.

There is also disclosed herein a satellite system comprising an antenna array system as previously described.

There is further disclosed a computer program for operating an antenna array 100 to increase cross polarization discrimination, the computer program comprising computer code which, when run on processing circuitry of an antenna array system 500, causes the antenna array 100 to execute the method previously described. There is also disclosed a computer program product comprising a computer program according to the above, and a computer readable storage medium on which the computer program is stored.

The invention claimed is:

1. A method for improving cross-polarization discrimination in a dual-polarized antenna array, the antenna array comprising a plurality of antenna elements, each antenna element comprising at least two feeding ports arranged to excite the antenna element with mutually independent signals having respective complex amplitudes, the method comprising:

measuring, for each of the feeding ports and for each antenna element, an electromagnetic far field resulting from excitation of the antenna element by the feeding port in terms of field components corresponding to two orthogonal linear polarizations;

selecting a desired circular polarization in the far field to be either right-handed or left-handed circular polarization;

determining, based on a predetermined relationship between the field components corresponding to the two orthogonal linear polarizations and on the desired circular polarization in the far field, a ratio between the complex amplitudes of excitation of the feeding ports of each antenna element, the ratio being associated with an increased cross-polarization discrimination; and exciting the antenna elements with signals having complex amplitudes according to the determined ratio.

2. The method according to claim 1, where the electromagnetic far field is determined for a plurality of directions, and the ratio between the complex amplitudes of the excitations of the feeding ports of each antenna element is determined for a desired direction of transmission and/or reception based on the determined electromagnetic far field in the desired direction.

3. The method according to claim 2, where the electromagnetic far field is determined for a plurality of frequencies, and the ratio between the complex amplitudes of the excitations of the feeding ports of each antenna element is determined for a desired frequency of transmission and/or reception based on the determined electromagnetic far field at the desired frequency.

4. The method according to claim 2, where the ratio between the complex amplitudes of excitation of two feeding ports of an antenna element is determined as $$\frac{b}{a} = -\frac{\left(E_\theta^a - jE_\varphi^a\right)}{\left(E_\theta^b - jE_\varphi^b\right)},$$

in the case of right-handed circular polarization being the desired polarization and $$\frac{b}{a} = -\frac{\left(E_\theta^a + jE_\varphi^a\right)}{\left(E_\theta^b + jE_\varphi^b\right)},$$

in the case of left-handed circular polarization being the desired polarization, where a and b are the complex amplitudes of the first and second feeding ports, $E_\theta^a$ is the field component in the θ direction arising from excitation of the first feeding port, $E_\varphi^a$ is the field component in the φ direction arising from excitation of the first feeding port, $E_\theta^b$ is the field component in the θ direction arising from excitation of the second feeding port, and $E_\varphi^b$ is the field component in the φ direction arising from excitation of the second feeding port.

5. The method according to claim 1, where the electromagnetic far field is determined for a plurality of frequencies, and the ratio between the complex amplitudes of the excitations of the feeding ports of each antenna element is determined for a desired frequency of transmission and/or reception based on the determined electromagnetic far field at the desired frequency.

6. The method according to claim 1, where the ratio between the complex amplitudes of excitation of two feeding ports of an antenna element is determined as $$\frac{b}{a} = -\frac{\left(E_\theta^a - jE_\varphi^a\right)}{\left(E_\theta^b - jE_\varphi^b\right)},$$

in the case of right-handed circular polarization being the desired polarization and $$\frac{b}{a} = -\frac{\left(E_\theta^a + jE_\varphi^a\right)}{\left(E_\theta^b + jE_\varphi^b\right)},$$

in the case of left-handed circular polarization being the desired polarization, where a and b are the complex amplitudes of the first and second feeding ports, $E_\theta^a$ is the field component in the θ direction arising from excitation of the first feeding port, $E_\varphi^a$ is the field component in the ϕ direction arising from excitation of the first feeding port, $E_\theta^b$ is the field component in the θ direction arising from excitation of the second feeding port, and $E_\varphi^b$ is the field component in the ϕ direction arising from excitation of the second feeding port.

7. The method according to claim 1, where the complex amplitudes of the excitations of the feeding ports of each antenna element are normalized by the magnitude of the largest complex amplitude for that antenna element.

8. The method according to claim 1, where the complex amplitudes of the excitations of the feeding ports associated with increased cross-polarization discrimination have been determined in advance for at least one desired polarization and the values stored in a lookup table from which the values can be retrieved during operation of the antenna array.

9. The method according to claim 8, where the lookup table comprises complex amplitudes calculated for a plurality of desired directions of transmission and/or reception.

10. The method according to claims 8, where the lookup table comprises complex amplitudes calculated for a plurality of desired frequencies of transmission and/or reception.

11. A non-transitory computer-readable medium on which is stored a computer program for operating an antenna array to increase cross polarization discrimination, the computer program comprising computer code which, when run on processing circuitry of an antenna array system, causes the antenna array to execute a method according to claim 1.

12. An antenna array system comprising:

a dual-polarized antenna array comprising a plurality of antenna elements, each of the antenna elements comprising at least two feeding ports arranged to excite the antenna element with mutually independent signals having respective complex amplitudes, an electromagnetic far-field resulting from excitation of each of the antenna elements by each feeding port being known in terms of the field components corresponding to two orthogonal linear polarizations being measured; and an antenna array controller configured to control the antenna array, wherein the system is configured to:

select a desired circular polarization in the far field to be either right-handed or left-handed circular polarization, determine, based on a predetermined relationship between the field components corresponding to the two orthogonal linear polarizations and on the desired circular polarization in the far field, a ratio between the complex amplitudes of the excitation of the feeding ports of each antenna element, the ratio being associated with increased cross-polarization discrimination, and excite the antenna elements with signals having complex amplitudes according to the determined ratio.

13. The system according to claim 12, where the electromagnetic far field is known for a plurality of directions, and the relation between the complex amplitudes of the excitations of the feeding ports of each antenna element are determined for a desired direction of transmission and/or reception based on the known electromagnetic far field in the desired direction.

14. The system according to claim 12, where the electromagnetic far field is known for a plurality of frequencies and the relation between the complex amplitudes of the excitations of the feeding ports of each antenna element are determined for a desired frequency of transmission and/or reception based on the determined electromagnetic far field for the desired frequency.

15. The system according to claim 12, where the ratio between the complex amplitudes of excitation of two feeding ports of an antenna element is determined as:

$$\frac{b}{a} = -\frac{\left(E_\theta^a - jE_\varphi^a\right)}{\left(E_\theta^b - jE_\varphi^b\right)},$$

in the case of right-handed circular polarization being the desired polarization and $$\frac{b}{a} = -\frac{\left(E_\theta^a + jE_\varphi^a\right)}{\left(E_\theta^b + jE_\varphi^b\right)},$$

in the case of left-handed circular polarization being the desired polarization, where a and b are the complex amplitudes of the first and second feeding ports, $E_\theta^a$ is the field component in the θ direction arising from excitation of the first feeding port, $E_\varphi^a$ is the field component in the θ direction arising from excitation of the first feeding port, $E_\theta^b$ is the field component in the θ direction arising from excitation of the second feeding port, and $E_\varphi^b$ is the field component in the φ direction arising from excitation of the second feeding port.

16. The system according to claim 12, where the complex amplitudes of the excitations of the feeding ports of each antenna element are normalized by the magnitude of the largest complex amplitude for that antenna element.

17. The system according to claim 12, where the complex amplitudes of the excitations of the feeding ports associated with increased cross-polarization discrimination have been calculated in advance for at least one desired polarization and the values stored in a lookup table in the antenna array control system, from which the values can be retrieved during operation of the antenna array.

18. The system according to claim 17, where the lookup table comprises complex amplitudes calculated for a plurality of desired directions of transmission and/or reception.

19. The system according to claims 14, where the lookup table comprises complex amplitudes calculated for a plurality of desired frequencies of transmission and/or reception.

20. A satellite system comprising an antenna array system according to claim 12.

* * * * *